United States Patent
Ueno et al.

(10) Patent No.: US 11,678,689 B2
(45) Date of Patent: Jun. 20, 2023

(54) PEELING METHOD

(71) Applicant: Sodick Co., Ltd., Kanagawa (JP)

(72) Inventors: Maya Ueno, Yokohama (JP); Yasuhisa Ogata, Yokohama (JP); Akinori Noguchi, Yokohama (JP)

(73) Assignee: Sodick Co., Ltd., Yokohama (JP)

( * ) Notice: Subject to any disclaimer, the term of this patent is extended or adjusted under 35 U.S.C. 154(b) by 427 days.

(21) Appl. No.: 16/689,463

(22) Filed: Nov. 20, 2019

(65) Prior Publication Data

US 2020/0187548 A1 Jun. 18, 2020

(30) Foreign Application Priority Data

Dec. 13, 2018 (JP) ............... JP2018-233022

(51) Int. Cl.
*A23P 30/32* (2016.01)
*A23N 7/02* (2006.01)

(52) U.S. Cl.
CPC .......... *A23P 30/32* (2016.08); *A23N 7/02* (2013.01); *A23V 2300/24* (2013.01); *A23V 2300/38* (2013.01)

(58) Field of Classification Search
CPC ....... A23P 30/32; A23N 7/02; A23V 2300/24; A23V 2300/38
USPC ................. 426/478, 479, 481, 482
See application file for complete search history.

(56) References Cited

U.S. PATENT DOCUMENTS 7,615,243 B2 * 11/2009 Hougland ............... A23N 7/02
426/511

FOREIGN PATENT DOCUMENTS

| CN | 107183738 A | 9/2017 |
| CN | 108523148 A | 9/2018 |
| JP | 46-40747 B | 12/1971 |
| JP | S48-099376 A | 12/1973 |
| KR | 1982-0000515 B1 | 4/1982 |
| KR | 1020010000064 A | 1/2001 |

OTHER PUBLICATIONS

Office Action dated Nov. 24, 2021, in connection with corresponding Chinese Application No. 201911172616.6 (13 pp., including machine-generated English translation).

Korean Office Action dated May 27, 2021, in connection with corresponding KR Application No. 10-2019-0160641 (10 pp., including machine-generated English translation).

* cited by examiner

*Primary Examiner* — Leslie A Wong
(74) *Attorney, Agent, or Firm* — Maier & Maier, PLLC

(57) ABSTRACT

A peeling method includes a first decompression step, a pressure-heating step, and a second decompression step. In the first decompression step, an object with a skin to be peeled is placed in a pressure chamber being sealed, and an inside of the pressure chamber is decompressed to a predetermined first negative pressure state. In the pressure-heating step, the inside of the pressure chamber is pressure-heated to a predetermined pressure-heating state after the first decompression step. In the second decompression step, the inside of the pressure chamber is decompressed to a predetermined second negative pressure state after the pressure-heating step.

1 Claim, 5 Drawing Sheets

PEELING METHOD

CROSS-REFERENCE TO RELATED APPLICATIONS

Field

The present application claims priority under 35 U.S.C. § 119 to Japanese Patent Application No. 2018-233022, filed Dec. 13, 2018. The contents of this application are incorporated herein by reference in their entirety. The present invention relates to a peeling method and a peeling device, especially for separating a skin and a body of a food of plant origin.

Background

As disclosed in Japanese Published Patent Application No. S48-099376, as a peeling method of separating a skin and a body of an object such as vegetables and fruits, a method is known to place the object in a pressure chamber, and perform peeling by rapidly decompressing an inside of the pressure chamber after pressure-heating the inside of the pressure chamber. According to this method, the skin can be removed where the body is almost retained, therefore a high yield of peeling can be reached. Hereinafter, the object to be peeled is simply referred the object.

On the other hand, when the object is exposed to a high temperature for a long time, the body may deteriorate depending on the kind. For instance, when starch is contained in the body, most of the starch will be gelatinized resulting in a-starch after a long-time heating treatment. Such a change may result in a decrease in a commercial value in the case that a raw starch is required as a commodity.

In addition, for the objects with a hard skin such as seeds, a stronger force is required for peeling. Therefore, the conventional peeling method by pressure-heating and rapid decompression may not be able to remove the skin completely.

SUMMARY

To overcome the above-noted shortcomings and to fulfill the stated needs, a main object of the present invention is to provide a peeling method and a peeling device which can perform more powerful peeling with a shorter heating time.

According to the present invention, there is provided a peeling method comprising: a first decompression step of placing an object with a skin to be peeled into a pressure chamber being sealed, and decompressing an inside of the pressure chamber to a predetermined first negative pressure state; a pressure-heating step of pressure-heating the inside of the pressure chamber to a predetermined pressure-heating state after the first decompression step; and a second decompression step of decompressing the inside of the pressure chamber to a predetermined second negative pressure state after the pressure-heating step.

In addition, according to the present invention, there is provided a peeling device comprising: a pressure chamber being sealed capable of accommodating an object with a skin to be peeled; a decompressor configured to decompress an inside of the pressure chamber; a vapor supplier configured to pressure-heat the inside of the pressure chamber; and a controller configured to control the decompressor and the vapor supplier, wherein the controller decompresses the inside of the pressure chamber to a predetermined first negative pressure state, provides vapor to the pressure chamber being decompressed and pressure-heats the inside of the pressure chamber to a predetermined pressure-heating state, and decompresses the inside of the pressure chamber to a predetermined second negative pressure state after the pressure-heating.

Effect of the Invention

According to the peeling method and the peeling device of the present invention, the effect of sufficient peeling can be reached even in a short-time heating treatment.

DETAILED DESCRIPTION

Embodiments will be described in detail with reference to drawings. The various features shown in the following embodiments can be combined with each other.

In addition, in the present specification, an object to be peeled refers to a food of plant origin, and is simply referred the object. Specifically, the object includes vegetables such as potatoes and sweet potatoes, fruits such as peaches and apples, and seeds such as buckwheat, sesame, chestnut, rapeseed, and sunflower seeds. The object contains a skin and a body. The skin refers to a part to be peeled. Specifically, the skin refers to a skin in vegetables, a skin of a receptacle and an epicarp in fruits, and a husk and an astringent skin in seeds. Additionally, skin, peel, and rind are not distinguished and are collectively referred to as skin. The body refers to an inside portion that covered by the skin, and substantially coincides with a residual portion after the skin is removed. In addition, a negative pressure state refers to a state in which a pressure is less than 1 atm, and a pressurized state refers to a state in which the pressure exceeds 1 atm.

First, a peeling device 1 according to the present embodiment will be described with reference to FIGS. 1 and 2.

Figure 1:
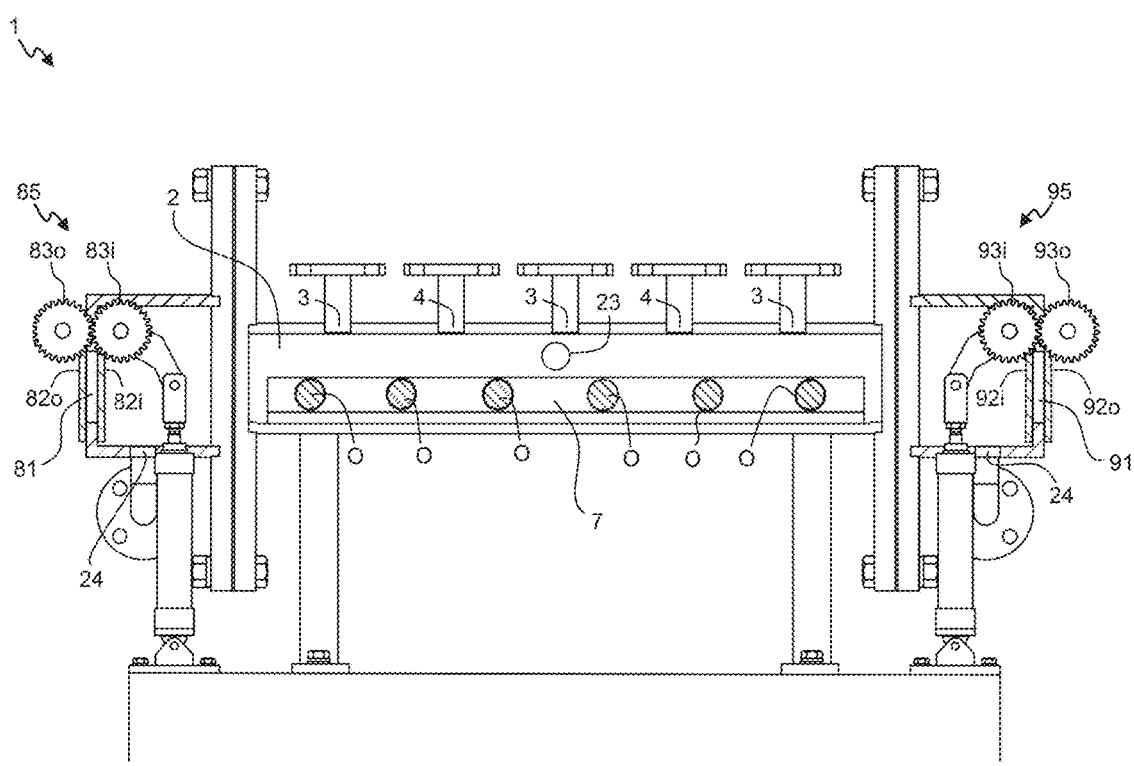
FIG. 1 is a schematic view illustrating the configuration of a peeling device according to the present embodiment.
Figure 2:
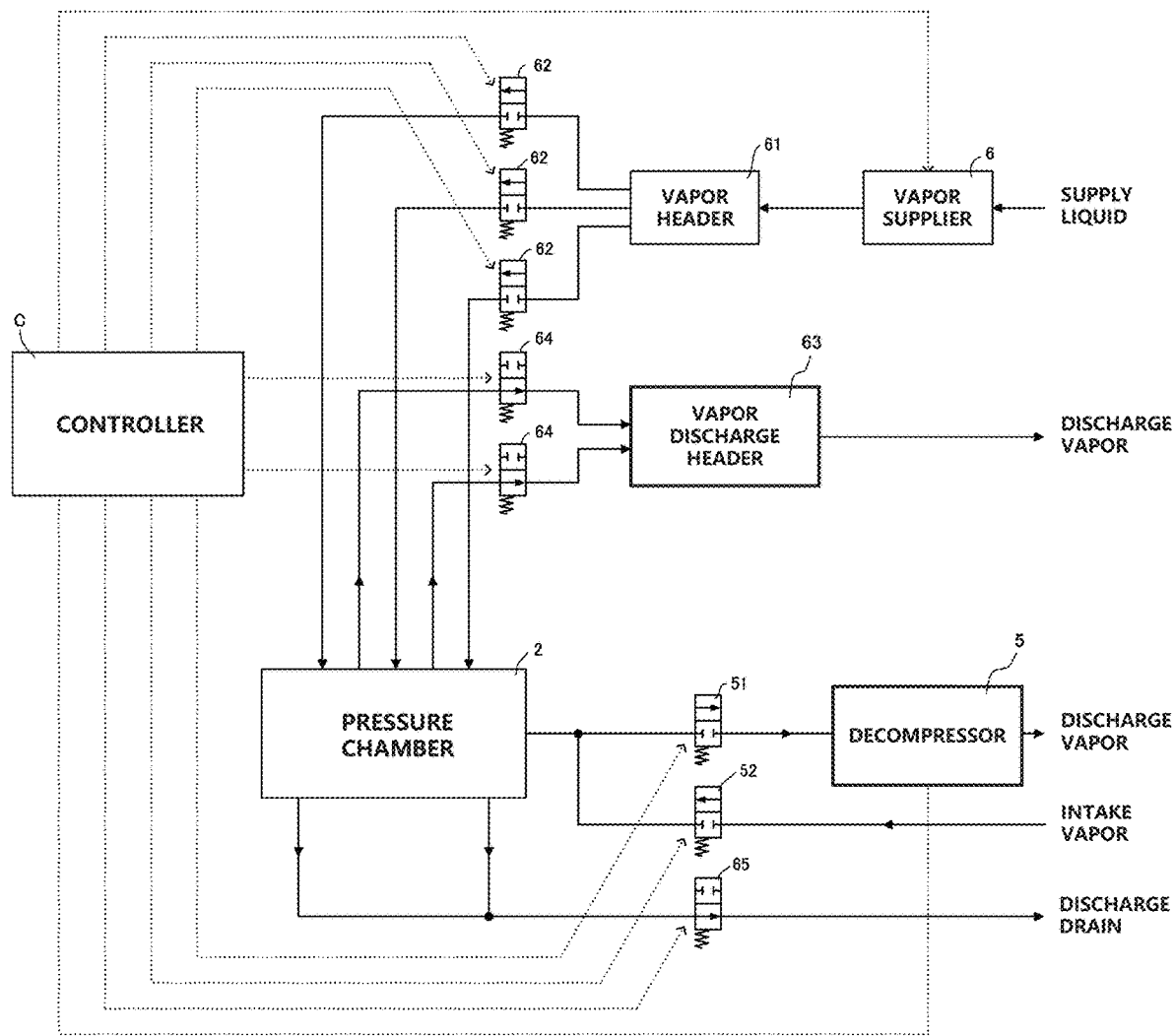
FIG. 2 is a circuit diagram illustrating an intake and discharge system of the peeling device.

FIG. 1 is a schematic view illustrating the configuration of a peeling device 1 according to the present embodiment. Further, FIG. 2 is a circuit diagram schematically showing an intake and discharge system of the peeling device 1. The peeling device 1 is a device that performs peeling on an object O by applying a decompression and a pressure-heating to peel a skin O1 of the object O. The peeling device 1 includes a pressure chamber 2 that accommodates the object O, and a controller C. The pressure chamber 2 includes a vapor supply port 21, a vapor discharge port 22, a decompression port 23, and a drain port 24.

The pressure chamber 2 includes a retainer 7 which is capable of retaining one or a plurality of objects O. In the case where a large amount of the objects O is peeled, a plurality of the retainers 7 may be configured to be inserted and exchanged in sequence. In FIG. 1, an example in which six objects O are placed on the retainer 7 and accommodated in the pressure chamber 2 is shown.

The decompression port 23 provided in the pressure chamber 2 is connected to a decompressor 5 via a pipe. The decompressor 5 is configured to be capable of decompressing an inside of the pressure chamber 2 being sealed to decompress the pressure in the pressure chamber 2 to a predetermined negative pressure state. A decompression valve 51 is provided in a pipe between the decompression port 23 and the decompressor 5. Further, the pipe connecting the decompression port 23 and the decompressor 5 branches between the decompression port 23 and the decompression valve 51, and communicates with an outside of the peeling device 1 (hereinafter, referred to the outside of the device) via a negative pressure breaking valve 52. In addition, a decompression chamber having a sealed space may be provided between the decompression valve 51 and the decompressor 5. Before the inside of the pressure chamber 2 is decompressed, the inside of the decompression chamber may be decompressed to the negative pressure state while the decompression valve 51 is closed. By opening the decompression valve 51 in this state, the inside of the pressure chamber 2 can be rapidly decompressed.

The vapor supply port 21 provided in the pressure chamber 2 is connected to a vapor supplier 6 via a pipe. The vapor supplier 6 is configured to be capable of supplying high-temperature pressurized vapor into the pressure chamber 2 being sealed. In order to spread the vapor as uniformly as possible throughout the pressure chamber 2, one or a plurality of vapor supply ports 21 are arranged at appropriate positions. A vapor inlet valve 62 is provided in a pipe between the vapor supply port 21 and the vapor supplier 6. The vapor inlet valve 62 and the vapor supplier 6 are preferably connected via a vapor header 61. When the plurality of vapor supply ports 21 are provided, the vapor header 61 gathers a plurality of pipes that respectively connected to the vapor supply port 21. Further, before the vapor is supplied into the pressure chamber 2, the vapor may be stored in the vapor header 61 while the vapor inlet valve 62 is closed. By opening the vapor inlet valve 62 in this state, the vapor can be rapidly supplied into the pressure chamber 2.

A pipe connected to the vapor discharge port 22 provided in the pressure chamber 2 communicates with the outside of the device via a vapor discharge valve 64. The vapor supplied into the pressure chamber 2 is discharged to the outside of the device through the vapor discharge port 22. In order to effectively discharge vapor from the inside of the pressure chamber 2, one or a plurality of vapor discharge ports 22 are arranged at appropriate positions. When the plurality of vapor discharge ports 22 are provided, a vapor discharge header 63 is preferably provided between the vapor discharge port 22 and the outside of the device. The vapor discharge header 63 gathers a plurality of pipes respectively connected to the vapor supply port 21.

A pipe connected to the drain port 24 provided in the pressure chamber 2 communicates with the outside of the device via a drain valve 65. A drain generated by condensation of the vapor supplied into the pressure chamber 2 is discharged to the outside of the device through the drain valve 65. Although two drain ports 24 are provided in the present embodiment, one or a plurality of drain ports 24 may be arranged at appropriate positions.

The pressure chamber 2 has a sealed space and is configured to be capable of pressure-heating the inside of the pressure chamber 2 by filling the inside of the pressure chamber 2 with vapor approximately uniformly. In other words, the pressure chamber 2 may be constituted by any structure as long as the structure is capable of reaching a predetermined pressure-heating state, and the material is not particularly limited as long as the pressure chamber 2 can maintain the pressure-heating state. In order to maintain the heating state, the pressure chamber 2 is preferably made of a material having high heat insulating properties. Further, in order to maintain the pressurized state and prevent the pressure from decreasing, it is preferable that the pressure chamber 2 and each pipe have a structure in which airtightness is maintained by welding or the like.

Opening and closing doors 85 and 95 are provided at both ends of the pressure chamber 2, respectively. The opening and closing door 85 includes an inner door 82$i$, an outer door 82$o$, a gear 83$o$ that interlocks with a rotation of the outer door 82$o$, and a gear 83$i$ that engages with the gear 83$o$ and interlocks with a rotation of the inner door 82$i$. Similarly, the opening and closing 95 includes an inner door 92$i$, an outer door 92$o$, a gear 93$o$ that interlocks with a rotation of the outer door 92$o$, and a gear 93$i$ that engages with the gear 93$o$ and interlocks with a rotation of the inner door 92$i$. When the inside of the pressure chamber 2 is decompressed, the outer door 82$o$ and 92$o$ are pressed against an outer wall surface of the pressure chamber 2 by the pressure difference, thereby the gears 83$o$, 83$i$, 93$o$, and 93$i$ rotate, and the inner doors 82$i$ and 92$i$ are also interlock to be pressed against an inner wall surface of the pressure chamber 2. When the inside of the pressure chamber 2 is pressurized, the inner doors 82$i$ and 92$i$ are pressed against the inner wall surface of the pressure chamber 2 by the pressure difference, thereby the gear 83$o$, 83$i$, 93$o$, and 93$i$ rotate, and the outer doors 82$o$ and 92$o$ also interlock to be pressed against the outer wall surface of the pressure chamber 2. In this way, the opening and closing doors 85 and 95 can highly seal the pressure chamber 2 with a simple configuration. The opening and closing doors 85 and 95 are opened when the retainer 7 is moved in and out, an opening 81 on the opening and closing door 85 side serves as an outlet of the retainer 7, and an opening 91 on the opening and closing door 95 side serves as an inlet of the retainer 7.

The decompressor 5 is configured to be capable of decompressing the pressure inside the pressure chamber 2 to the predetermined negative pressure state by sucking atmosphere inside of the pressure chamber 2 and discharging the atmosphere from the decompression port 23 to the outside of the device. An example of the decompressor 5 is a vacuum pump. The decompressor may be any other device that capable of forming the negative pressure state.

The vapor supplier 6 can reach a high temperature and a high pressure in the pressure chamber 2 by supplying the vapor from the vapor supply port 21. An example of the vapor supplier 6 is a boiler that heats supplied liquid to generate the vapor at a predetermined pressure and a predetermined temperature. The vapor supplier 6 may be any other device that capable of generating a vapor at a predetermined pressure and a predetermined temperature. The vapor is preferably a steam. The vapor is preferably a saturated vapor.

The controller C has a function of controlling the decompressor 5 and a function of controlling the vapor supplier 6. The controller C controls opening and closing of the decompression valve 51, the negative pressure breaking valve 52, the vapor inlet valve 62, the vapor discharge valve 64, and the drain valve 65. A time for a decompression treatment by the decompressor 5 and a pressure-heat treatment by the vapor supplier 6 can be set for the controller C. Further, when a pressure value of the treatment by the decompressor 5 or the vapor supplier 6 can be controlled freely, the controller C may set a predetermined pressure value at the time of the decompression treatment or the pressure-heat treatment. The temperature of the vapor supplied by the vapor supplier 6 may be changed by changing the pressure value. Based on these set values, the controller C controls the decompressor 5 and the vapor supplier 6 in the peeling device 1 to perform the decompression treatment or the pressure-heating treatment. The controller C may be arranged at a place where each function can be performed.

Furthermore, the controller C may also include a combination of hardware resources implemented by a generalized circuit and an information processing of software that can be specifically implemented by these hardware resources, for example. As a hardware resources, a circuit implemented by at least appropriately combining a circuit, a circuitry, a processor, a memory, and the like. That is, an application specific integrated circuit (ASIC), a programmable logic device such as simple programmable logic device (SPLD), a complex programmable logic device (CPLD), a field programmable gate array (FPGA), and the like.

The controller C decompresses the inside of the pressure chamber 2 to the negative pressure state after accommodating the object O in the pressure chamber 2, supplies the vapor to the pressure chamber 2 being decompressed and pressure-heats the inside of the pressure chamber 2, and decompresses the inside of the pressure chamber 2 after pressure-heating to the negative pressure state. Since the decompression is performed twice, a different value is set for the predetermined pressure value or the treatment time described above when the first decompression treatment (i.e., a first decompression step) and the second decompression treatment (i.e., a second decompression step) are performed under different treatment conditions. Hereinafter, the negative pressure state during the first decompression step is referred to a first negative pressure state, the negative pressure state during the second decompression step is referred to a second negative pressure state.

Figure 3:
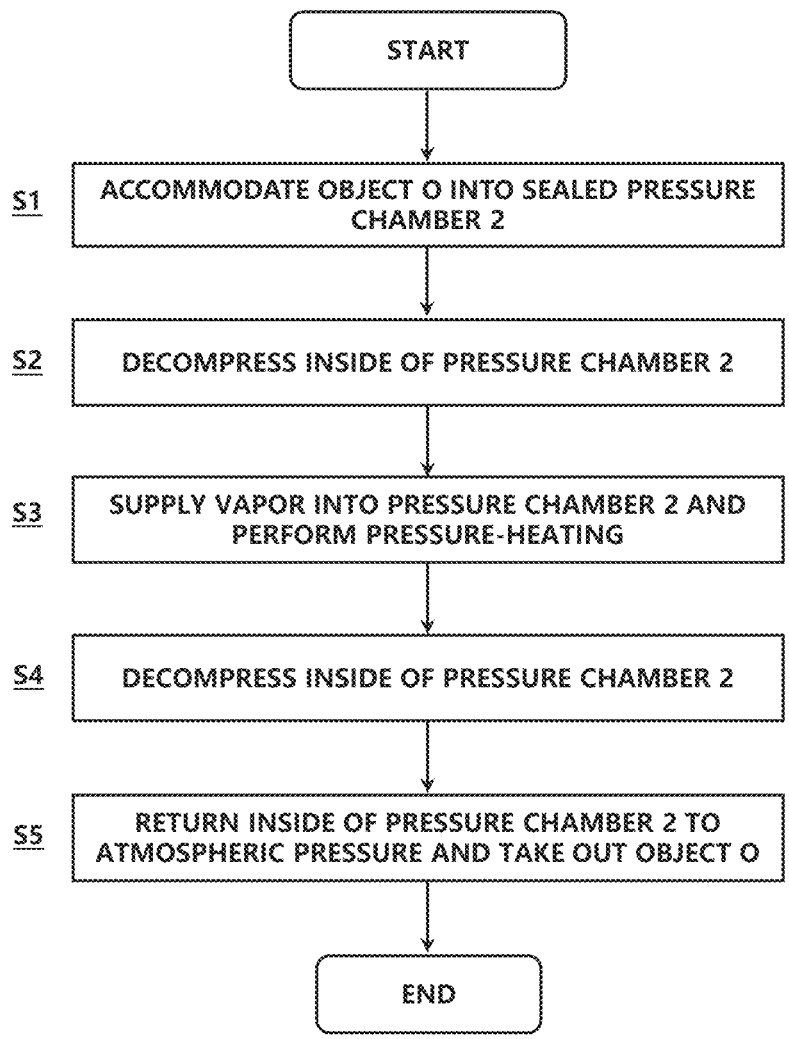
FIG. 3 is a flowchart illustrating a peeling method using the peeling device.

Next, a peeling method using the above-described peeling device 1 will be illustrated. Here, a step of peeling the skin O1 of the object O according to each step of the flowchart shown in FIG. 3 will be described.

Figure 4:
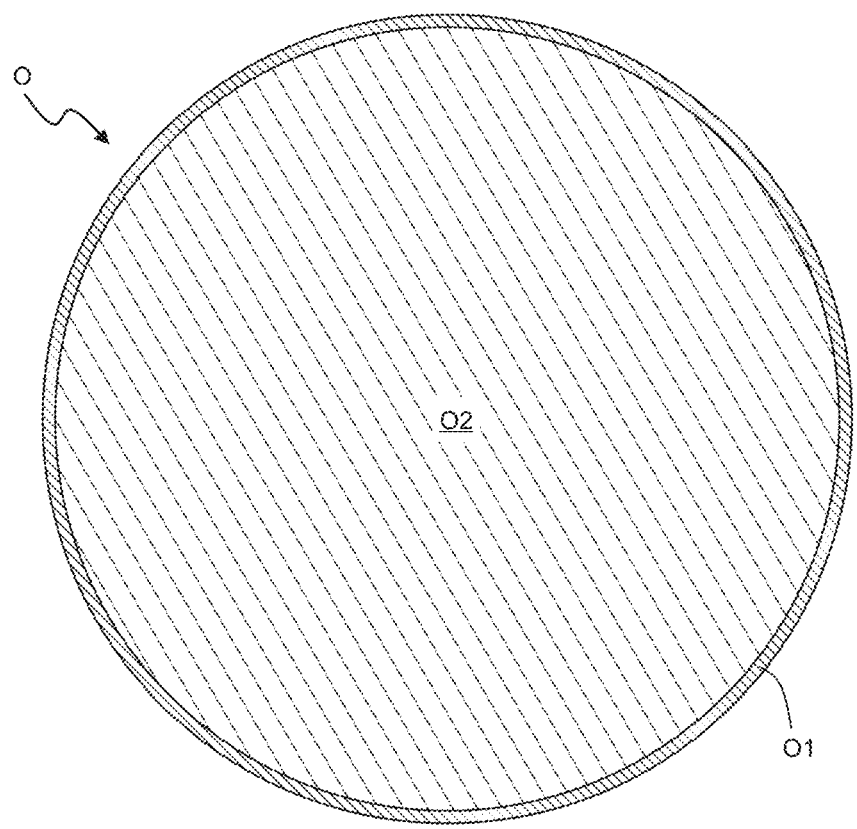
FIG. 4 is a schematic view illustrating an object before a peeling treatment.

In a step S1, the object O to be peeled has the skin O1 and the body O2 as shown in FIG. 4, and is accommodated in the pressure chamber 2. After the accommodation, the opening and closing doors 85 and 95 are closed, and the pressure chamber 2 is sealed.

In a step S2, that is, the first decompression step is performed. The inside of the pressure chamber 2 is decompressed to the predetermined first negative pressure state. Specifically, the decompression valve 51 is opened in a state where the negative pressure breaking valve 52, the vapor inlet valve 62, the vapor discharge valve 64, and the drain valve 65 are closed. Then, the decompressor 5 is operated to discharge the air from the decompression port 23 to the outside of the device, and the inside of the pressure chamber 2 is brought into the first negative pressure state. The first negative pressure state may be any pressure range of less than 1 atm (approximately 0.10 MPa). More preferably, the first negative pressure state is in a pressure range of 0.07 MPa or less so that the vapor is more rapidly spread throughout the pressure chamber 2 in a pressure-heating step to be described later. In the present embodiment, the inside of the pressure chamber 2 is set to a pressure of approximately 0.05 MPa or less.

Through the step S2, the inside of the pressure chamber 2 reaches the first negative pressure state. As a result, when the vapor is supplied in the next step S3, the vapor can be rapidly spread throughout the pressure chamber 2, therefore uniform pressure-heating can be rapidly performed.

In a step S3, that is, a pressure-heating step is performed. After the step S2, the high-temperature and high-pressure vapor is supplied to the inside of the pressure chamber 2, and the pressure chamber 2 is set to the predetermined pressure-heating state. That is, the pressure-heating is performed in the pressure chamber 2. Specifically, the vapor inlet valve 62 is opened in a state where the decompression valve 51, the negative pressure breaking valve 52, the vapor discharge valve 64, and the drain valve 65 are closed. Then, the vapor supplier 6 is operated to supply the vapor from the vapor supply port 21 into the pressure chamber 2, and the inside of the pressure chamber 2 is brought into the pressure-heating state. The temperature range of the vapor may be any temperature range exceeding 100° C. More preferably, the temperature range is 200° C. or less so that the deterioration of the object O due to the heat can be suppressed. Moreover, the pressure range of the pressure-heating state is preferably more than 1 atm (approximately 0.10 MPa) and less than or equal to 1.60 MPa. In the present embodiment, the inside of the pressure chamber 2 is set to a pressure of approximately 0.45 MPa. At this time, the temperature in the pressure chamber 2 is approximately 146° C.

Through the step S3, when the vapor contacts the object O lower than the temperature of the vapor, the vapor condenses on an outer surface of the skin O1 of the object O, and a large thermal energy generated by latent heat of condensation is applied to the outer surface, and high temperature liquid penetrates into the skin O1 of the object O. Further, because of the latent heat of condensation at this time, moisture contained in a vicinity of the outer surface of the object O also reaches a high temperature state.

Figure 5:
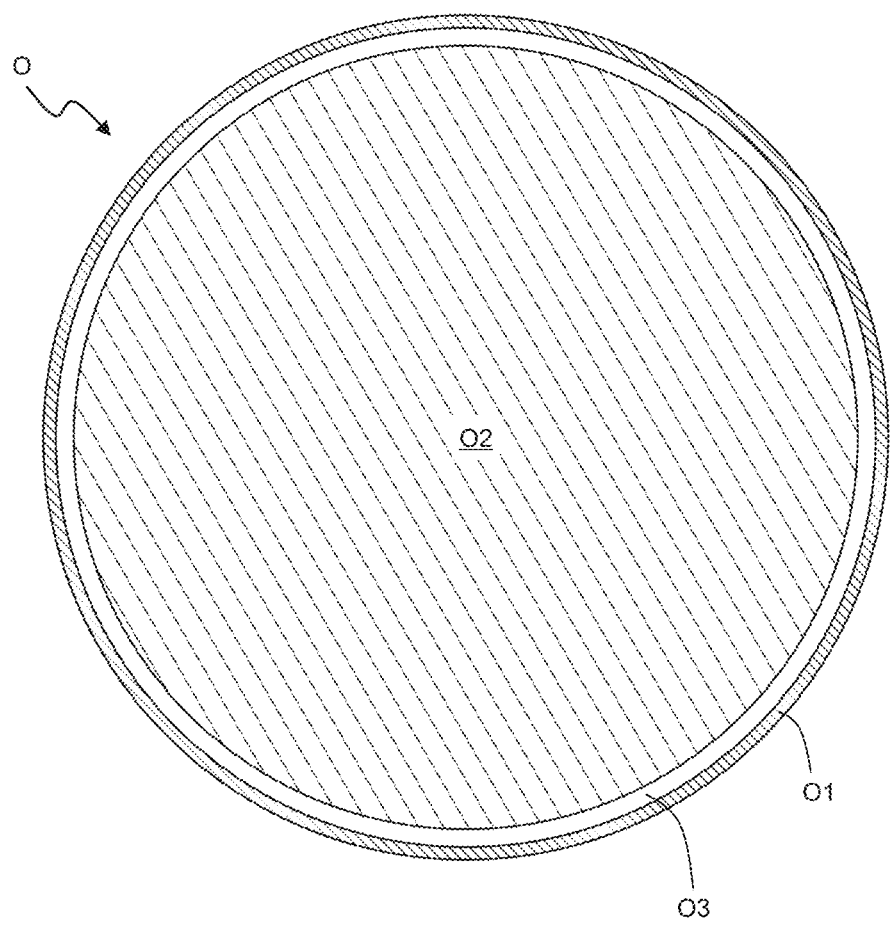
FIG. 5 is a schematic view illustrating the object after the peeling treatment.

In a step S4, that is, the second decompression step is performed. In the step S3, the inside of the pressure chamber 2 that has reached the high temperature and the high pressure is decompressed to the predetermined second negative pressure state. Specifically, the vapor discharge valve 64 and the drain valve 65 are opened in a state where the decompression valve 51, the negative pressure breaking valve 52, and the vapor inlet valve 62 are closed. Then, the vapor in the pressure chamber 2 is discharged from the vapor discharge port 22 to the outside of the device, and the drain generated by the condensation of the vapor is discharged from the drain port 24 to the outside of the device. Next, the decompression valve 51 is opened in a state where the negative pressure breaking valve 52, the vapor inlet valve 62, the vapor discharge valve 64, and the drain valve 65 are closed. Then, the decompressor 5 is operated to discharge the air from the decompression port 23 to the outside of the device, and the inside of the pressure chamber 2 is brought into the second negative pressure state. When the boiling point of the liquid decreases because of the decompression inside the pressure chamber 2, the moisture between the skin O1 and the body O2 is boiled to form a very large volume of vapor, and as shown in FIG. 5, a gap O3 is formed between the skin O1 and the body O2, and the skin O1 in the object O is separated from the body O2. In particular, when the inside of the pressure chamber 2 is brought into the second negative pressure state, the temperature of the boiling point can be lowered, so that the force of the peeling can be performed more strongly than simply returning the inside of the pressure chamber 2 to 1 atm after pressure-heating. The second negative pressure state may be any pressure range of less than 1 atm (approximately 0.10 MPa), but it is desirable that the second decompression step can be rapidly performed after the pressure-heating step. By setting the pressure in the second negative pressure state to be lower, the decompression can be performed more rapidly. For example, a rate of movement of the moisture becomes the vapor in the second decompression step, that is, an adiabatic expansion rate is preferably 390 m/s or more.

In a step S5, the negative pressure breaking valve 52 is opened, and the inside of the pressure chamber 2 that has been decompressed in the step S4 is returned to an atmospheric pressure. Then, the opening and closing door 85 is opened, and the object O is taken out from the inside of the pressure chamber 2. By carrying out such a peeling method, the object O is brought into a state where the skin O1 can be easily removed. In order to completely remove the skin O1, for example, a predetermined frictional force may be applied by being pinched by a brush roller or the like, or a fluid such as air may be sprayed, and various means may be employed.

It should be noted that if there is an environment in which these steps S1 to S5 can be appropriately performed, it is not necessary to use the above-described peeling device 1. In carrying out the peeling method of the present invention, a device having a different configuration capable of performing the above-described steps S1 to S5 may be used.

As described above, according to the present embodiment, it is capable to implementing the peeling method and the peeling device 1 which can perform stronger peeling with a shorter heating time. The time required for the pressure-heating in the pressure-heating step is 1 second or more and 60 seconds or less from the start of the process, for example. In the present embodiment, a pressure-heating step of approximately 10 seconds is performed.

The peeling method is characterized in that the first decompression step of placing the skin O1 into the pressure chamber 2 being sealed, and decompressing the inside of the pressure chamber 2 to the first negative pressure state; the pressure-heating step of pressure-heating the inside of the pressure chamber 2 after the first decompression step; and the second decompression step of decompressing the inside of the pressure chamber 2 to the second negative pressure state after the pressure-heating step.

While various embodiments according to the present invention have been described, these embodiments are presented as examples and are not intended to limit the scope of the invention. These novel embodiments can be implemented in various other forms, and various omissions, replacements, and changes can be apparent in light of the foregoing description. The accompanying claims and their equivalents are intended to cover such forms or modifications as would fall within the scope and spirit of the invention.

The invention claimed is:
1. A peeling method, comprising:
a first decompression step of placing an object with a skin to be peeled into a pressure chamber being sealed, and decompressing an inside of the pressure chamber to a first negative pressure state, wherein the first negative pressure state is less than 1 atm;
a pressure-heating step of supplying vapor exceeding 100° C. into the inside of the pressure chamber decompressed to being in the first negative pressure state and pressure-heating the inside of the pressure chamber to a pressure heating state after the first decompression step, wherein the pressure heating state is more than 1 atm; and
a second decompression step of decompressing the inside of the pressure chamber pressure-heated to being in the pressure heating state to a second negative pressure state after the pressure-heating step, wherein the second negative pressure state is less than 1 atm,
wherein the first decompression step, the pressure-heating step, and the second decompression step are performed in order, the pressure-heating step is performed to the pressure chamber being in the first negative pressure state after the first decompression step, and the second decompression step is performed to the pressure chamber being in the pressure heating state after the pressure-heating step.

* * * * *